(12) United States Patent
Sinclair et al.

(10) Patent No.: US 6,545,701 B2
(45) Date of Patent: Apr. 8, 2003

(54) PANORAMIC DIGITAL CAMERA SYSTEM AND METHOD

(75) Inventors: Michael J. Sinclair, Kirkland, WA (US); Lance E. Simmons, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/133,725

(22) Filed: Aug. 13, 1998

(65) Prior Publication Data

US 2001/0043264 A1 Nov. 22, 2001

Related U.S. Application Data

(60) Provisional application No. 60/655,537, filed on Aug. 13, 1997.

(51) Int. Cl.[7] .......................... H04N 7/00; H04N 5/225
(52) U.S. Cl. ........................................ 348/36; 348/169
(58) Field of Search .................. 348/36, 337, 169, 348/211, 356; 358/454; 351/212

(56) References Cited

U.S. PATENT DOCUMENTS

| | | | |
|---|---|---|---|
| 4,588,270 A * | 5/1986 | Tamaki | 351/212 |
| 4,672,456 A * | 6/1987 | Murai et al. | 348/356 |
| 4,882,619 A * | 11/1989 | Hasegawa et al. | 348/337 |
| 4,893,195 A * | 1/1990 | Tada et al. | 358/454 |
| 5,073,824 A * | 12/1991 | Vertin | 348/211 |
| 5,416,513 A * | 5/1995 | Morisaki | 348/169 |
| 5,467,127 A * | 11/1995 | Jong-Pil | 348/169 |

* cited by examiner

*Primary Examiner*—Chris Kelley
*Assistant Examiner*—Allen Wong
(74) *Attorney, Agent, or Firm*—Thomas, Kayden, Horstemeyer & Risley, LLP

(57) ABSTRACT

A digital panoramic camera system for producing digital panoramic images includes a camera body forming a linear optic path and which is rotatably mounted to a motor. An infrared cutoff filter is also provided along the optic path for filtering light which is then provided to a charge coupled device. The charge coupled device generates analog signals corresponding to color information transmitted by the light to an analog interface which tunes the analog signals. A series of pulses is provided to the motor and to an analog to digital converter, thereby synchronizing rotation of the camera body with the conversion of analog signals to digital signals within the converter. A digital interface unit is also provided which receives digital signals from the converter and provides converted digital signals to a computer for processing the signals into a digital panoramic image.

15 Claims, 5 Drawing Sheets

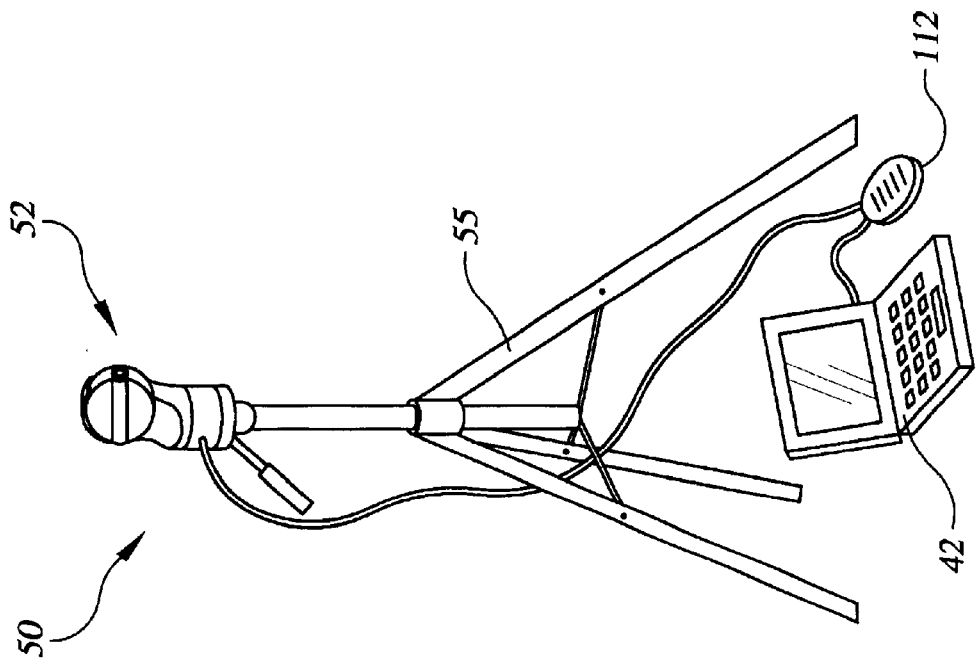
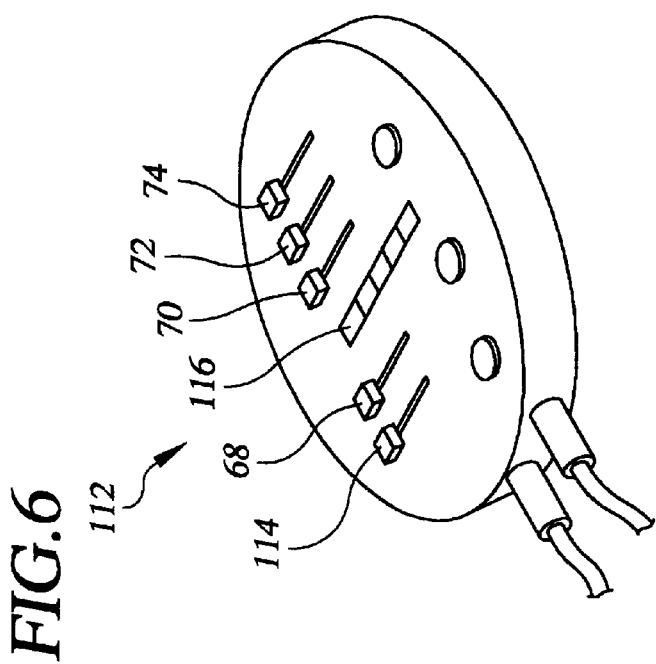

PANORAMIC DIGITAL CAMERA SYSTEM AND METHOD

RELATED APPLICATIONS

This application is based on and claims priority to U.S. Provisional Application Ser. No. 60/055,537, filed on Aug. 13, 1997.

BACKGROUND OF THE INVENTION

1. Field of the Invention

The present invention relates generally to the field of optical scanning, and more particularly, to the use of optical scanning components in a digital panoramic camera.

2. Description of the Prior Art

For innumerable years, many people have endeavored to capture visual images which more accurately depict what the human eye perceives. Since a human eye possessing normal visual acuity has a nominal horizontal field of view (FOV) of approximately 137°, several methods for producing images which incorporate a horizontal FOV of at least a 100°, known as panoramas, have been developed. These methods as applied to photography include: (1) segmented panorama; (2) swing lens panorama; (3) conventional panorama; (4) rotational panorama; (5) strip scan panorama, and, most recently; (6) virtual reality imagery.

Segmented panorama is the oldest method of creating a photographic image with a wide FOV. This method includes photographing a series of images with a standard camera so that each successive image includes a portion of the previous image. The photographs are then displayed adjacent one another, thereby forming a composite, wide FOV image.

Swing lens panorama, in contrast, is created by utilizing a device which incorporates a camera with a pivoting lens and a film which is fixedly mounted upon a curved plate. The lens pivots from side to side while transferring or "wiping" an image onto the fixed film, thereby typically creating a panoramic image with an FOV of approximately 140°. Numerous contemporary cameras, such as the Widelux 1500, the Noblex 6/150S, the ArtPanorama 170, the Linhof 617, and the Fuji Gx617 Pro, incorporate the swing lens methodology.

Conventional panorama, currently the most common method used to create a panoramic image utilizes a device which incorporates a fixed lens camera and a fixed film. The device records an image which is cropped into an elongated format, thereby rendering an image with a relatively limited FOV.

Unlike conventional panorama, rotational panorama is created by a device which incorporates rotating film and a rotating camera with the film and the camera rotating in opposite directions. These devices are capable of producing panoramas with an FOV of greater than 360°. Contemporary cameras, such as the Roundshot 35, the LarScan, the Hulcherama 120S, and the Globuscope, incorporate the rotational panorama methodology.

Strip scan panorama, like rotational panorama, is created by a device which incorporates a rotating camera. Unlike rotational panorama, however, film speed of the strip scan device is matched to the speed of a moving image. Images such as finish line photos of races are often taken with this technique.

In contrast to the aforementioned techniques for creating panoramic images, virtual reality (VR) technology allows a person to interact with wide FOV spatial environments through the use of a computer. These environments have heretofore typically been artistic renderings or computer models, which, until recently, required the use of specialized hardware or accessories, such as high-end graphics workstations, 3D goggles, etc. Improvements, particularly in the area of computer software, i.e. Quick Time VR (QTVR) by Apple, among others, allows a person to create interactive panoramic images within a virtual reality environment, thereby allowing a person to interact with wide FOV imagery using only a personal computer.

QTVR allows extremely high quality, photographed or rendered 3D environments or objects to be played back in real-time on low-end computers. QTVR technology allows computer users easily to create and view either a panorama from a perspective of 360° or more, or an object from all sides, and is particularly useful in generating imagery for such fields as travel, education, architecture, sales, manufacturing, real estate and art. It should be noted that although QuickTime VR is mentioned throughout for ease of description, there are numerous VR imaging software authoring packages available for various computer operating systems which are well suited for use with the present invention.

Typically, the first step in creating a VR panorama is to take a series of photographs with a standard camera. The camera is rotated after each picture is taken until 360° of images along a horizontal plane are captured, allowing some overlap between individual images. Normally 12 to 24 pictures are required depending on the camera lens used. The film containing the images is then processed in a conventional manner.

After the pictures have been processed, the film must be scanned for use on a computer, with the image data being transferred to a computer-readable medium, such as a Kodak PhotoCD (PCD). The images from the PCD must then be loaded into a computer and saved as specific image files.

The next step is sometimes the most time consuming and includes digitally "stitching" together all of the stored digital images. During "stitching", the QuickTime VR software blends the individual source images into a seamless panorama; however, the stitching process does not always work perfectly. Many times an individual image will be offset or misaligned from an adjacent image which is being imported into the QuickTime VR software resulting in an inability of the software to compensate adequately for the misaligned images. In the event of such an occurrence, manual fine-tuning of the image stitching process is required. This process can take several hours depending on the user's experience, computer hardware, and the number of images that need to be stitched. (For a more in-depth discussion of "stitching," see U.S. Pat. No. 5,611,033).

When the images have been successfully stitched together, the digital panoramic image can be edited by means of image editing software such as Adobe Photoshop.

Finally, the digital panoramic image is converted into a playable QTVR scene through the use of the QuickTime VR software so that the viewer is presented in the middle of the digital panoramic image and so that the viewer can freely pan around the image, e.g. look upward/downward and zoom in/out. Individual digital panoramic images can then be linked together so the viewer can "walk through," view and interact with a series of such images.

Since it is anticipated that digital panoramic images for use in virtual reality applications will be used more extensively as the World Wide Web grows, it is, desirable to provide a device which can reduce production time and cost associated with creating digital panoramic images.

SUMMARY OF THE INVENTION

Certain objects, advantages and novel features of the invention will be set forth in part in the description that follows and in part will become apparent to those of ordinary skill in the art upon examination of the following or may be learned with the practice of the invention. The objects and advantages of the invention may also be realized and obtained by means of the instrumentalities and combinations particularly pointed out in the appended claims.

The present invention is generally directed to a panoramic digital camera system and method for obtaining digital images in a three dimensional environment. Specifically, a preferred embodiment of the present invention includes a digital camera containing a lens for focusing light onto a linear charge coupled device (CCD) which produces analog signals in response thereto. Infrared filtering means in the optic path is preferably used for eliminating the adverse effects of infrared energy. Additionally, means for amplifying or attenuating the analog signals is included to "condition" or "tune" the signals. Also, a slit is positioned in front of the lens and parallel to the CCD to reduce flare. Once the signals are conditioned, they are converted into digital data through an analog to digital converter. The digital data is then transmitted via a digital interface electronics unit to a computer for image processing.

Advantageously, a preferred embodiment of the digital camera is rotatably mounted to a stepper motor, which, through control circuitry, rotates the camera about a substantially vertical axis at the lens' front nodal point to provide a full panoramic view about a substantially horizontal plane. A pulse generator is also provided which synchronizes the rotation of the digital camera, acquisition of image lines of data, and image processing software running on the computer.

The present invention can also be viewed in general as providing a method for creating digital panoramic images. The method can be broadly summarized as follows: (1) providing an optic path; (2) filtering light that propagates along the optic path so that light having a wavelength below a predetermined wavelength is substantially prevented from propagating along the optic path; (3) providing a charge coupled device along the optic path which is color responsive to the filtered light so that the charge coupled device generates analog signals corresponding to the color information; (4) rotating the optic path about a rotational axis at a predetermined rate/angle; (5) processing the analog signals generated by the charge coupled device; (6) synchronizing the processing of the analog signals with the rotation of the optic path so that a series of processed digital signals corresponding to the color information is produced, and; (7) converting the digital signals into a digital image.

Inasmuch as the digital camera of the present invention is capable of utilizing existing components from contemporary hand-held optical scanners, the present invention potentially enjoys a significant economic advantage over prior art digital panoramic cameras. In addition, the present invention provides digital quality imaging that is economically competitive with conventional film. Moreover, the present invention produces pictures almost immediately, in contrast to developing and digitizing film, which is both time consuming and expensive.

Additional advantages will become apparent from a consideration of the following description and drawings:

BRIEF DESCRIPTION OF THE DRAWINGS

The accompanying drawings incorporated in and forming a part of the specification illustrate several aspects of the present inventions, and together with the description serve to explain the principles of the inventions. The components in the drawings are not necessarily to scale, emphasis instead being placed upon clearly illustrating principles of the present invention.

FIG. 3 is a perspective view of a preferred embodiment of the digital panoramic camera system of the present invention.

FIG. 6 is a perspective view of a preferred embodiment of the control unit of the present invention.

DETAILED DESCRIPTION OF THE PREFERRED EMBODIMENT

Figure 1:
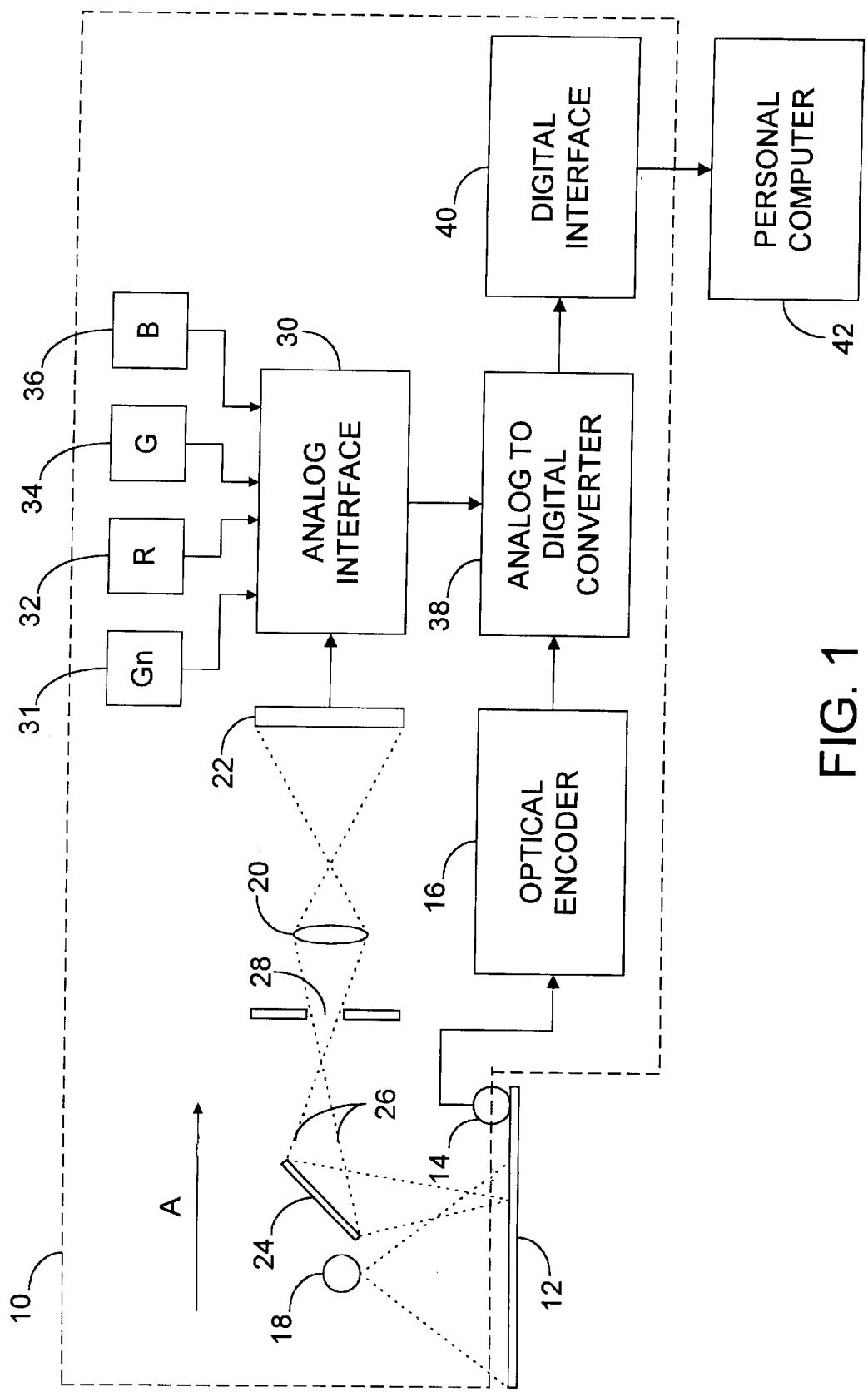
FIG. 1 is a block diagram illustrating the components found in a prior art optical scanner.

While the present invention is susceptible to various modifications and alternative forms, a preferred embodiment thereof is shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the present invention as defined by the claims.

With reference to FIG. 1, a prior art optical scanner 10, for example, but not limited to, the Scanman 2000 manufactured by Logitech for use in scanning flat work pieces in multiple inch strips, will now be described. As shown in FIG. 1, an operator moves the scanner 10 in a single direction (direction A), referred to as the scanner movement direction, across a flat work piece 12, i.e. a photograph. For best results, the scanner is moved in a smooth motion and at a consistent velocity which is consistent with a computer being able to accept generated scanner data.

A roller 14 extends from the scanner 10 for engaging the work piece 12 in order to track the position of the scanner relative to the work piece during scanning. Information generated by the roller is then sent to an internal optical encoder 16 for conveying position information. Additionally, the scanner includes a light 18 for illuminating the work piece 12 and a lens 20 for projecting images illuminated by the light onto a linear CCD 22. Mirrors 24 are also provided to direct the optic path 26 from the work piece 12 through a slit 28 which is positioned in front of the lens 20, and which is oriented substantially perpendicularly to the work piece.

The linear CCD 22 contains approximately 1600 photo diodes or pixels (not shown) which are responsive to the light received through the lens 20. Each of the pixels is equipped with a red, green, or blue filter (not shown) that filters the incoming light and facilitates generation of an analog voltage which is representative of color information. In contrast with a two dimensional piece of film or a two dimensional CCD sensor typically used in video cameras, the pixels in the linear CCD 22 are oriented in a straight line which is oriented substantially perpendicularly to the work piece 12 as well as substantially parallel to the slit 28.

Moreover, the line defined by the CCD 22 and the slit 28, known as the "scan line," is substantially perpendicular to the scanner movement direction (direction A) discussed in the foregoing.

The analog signals generated by the pixels are used as inputs into an analog interface electronics unit (AIE) 30. The AIE 30 demultiplexes the analog signals generated by the red, green and blue pixels and amplifies or attenuates the analog signals in each of the red, green or blue pixel groups to condition or tune the analog data to produce a clear and accurate image. Four separate potentiometers 31, 32, 34 and 36, including one for system gain and one for each color group, respectively, are used to adjust the amplification/attenuation of the analog signals.

Once the analog signals have been conditioned, they are converted into digital data through an analog to digital converter (ADC) 38. However, in order to synchronize the scanning process, the optical encoder 16 generates a pulse, typically once for every 1/200" of travel by the roller 14, thereby triggering ADC 38 to accept another set of 1600, conditioned, analog signals from the ALE 30. It should be noted, however, that the number of analog signals processed based on the scan distance is an engineering parameter that can vary between scanning systems and is typically adjustable according to the desired scan resolution.

Finally, the digitized color information from ADC 38 is transmitted to a digital interface electronics unit (DIE) 40 and then to a computer 42, i.e. a personal computer, for processing. Typically, the data will be transmitted into a parallel port (not shown) of computer 42, where image processing software interprets the digital data and displays the resulting image as it is being scanned. Warning messages are often provided if the operator is scanning the work piece too fast for the circuitry and software to generate, buffer, and process the digital data.

Figure 2:
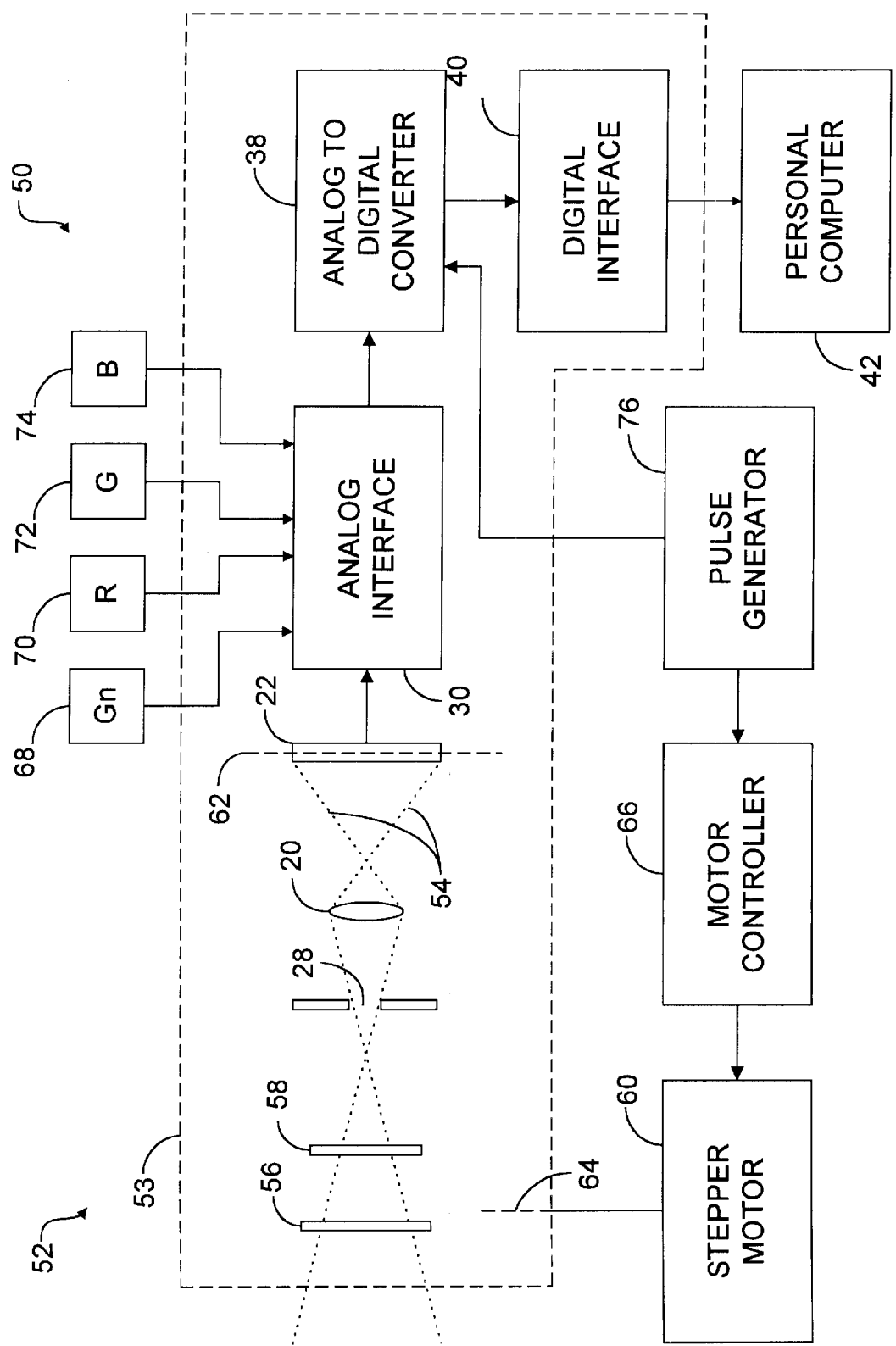
FIG. 2 is a block diagram illustrating a preferred embodiment of the digital panoramic camera system of the present invention.
Figure 4B:
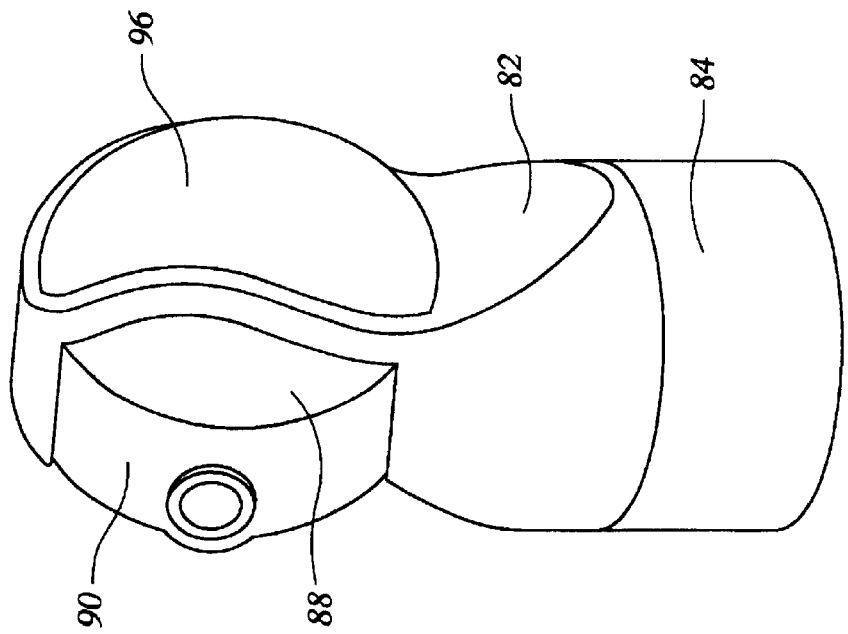
FIGS. 4A and 4B are perspective views of a preferred embodiment of the digital panoramic camera of the present invention.
Figure 4A:
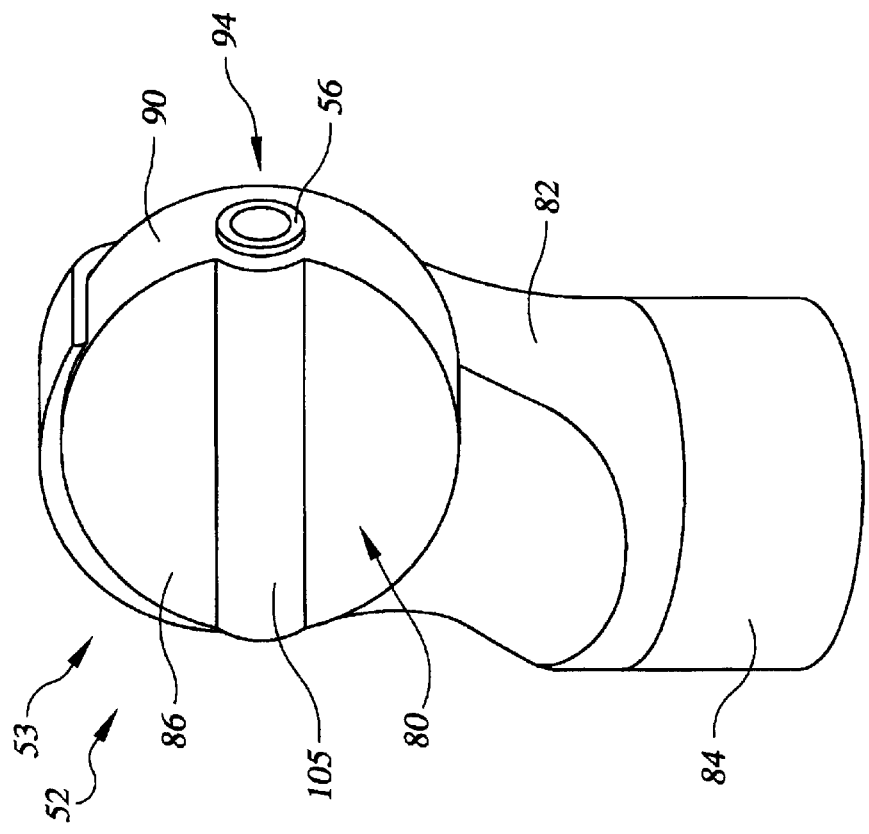
Figure 5:
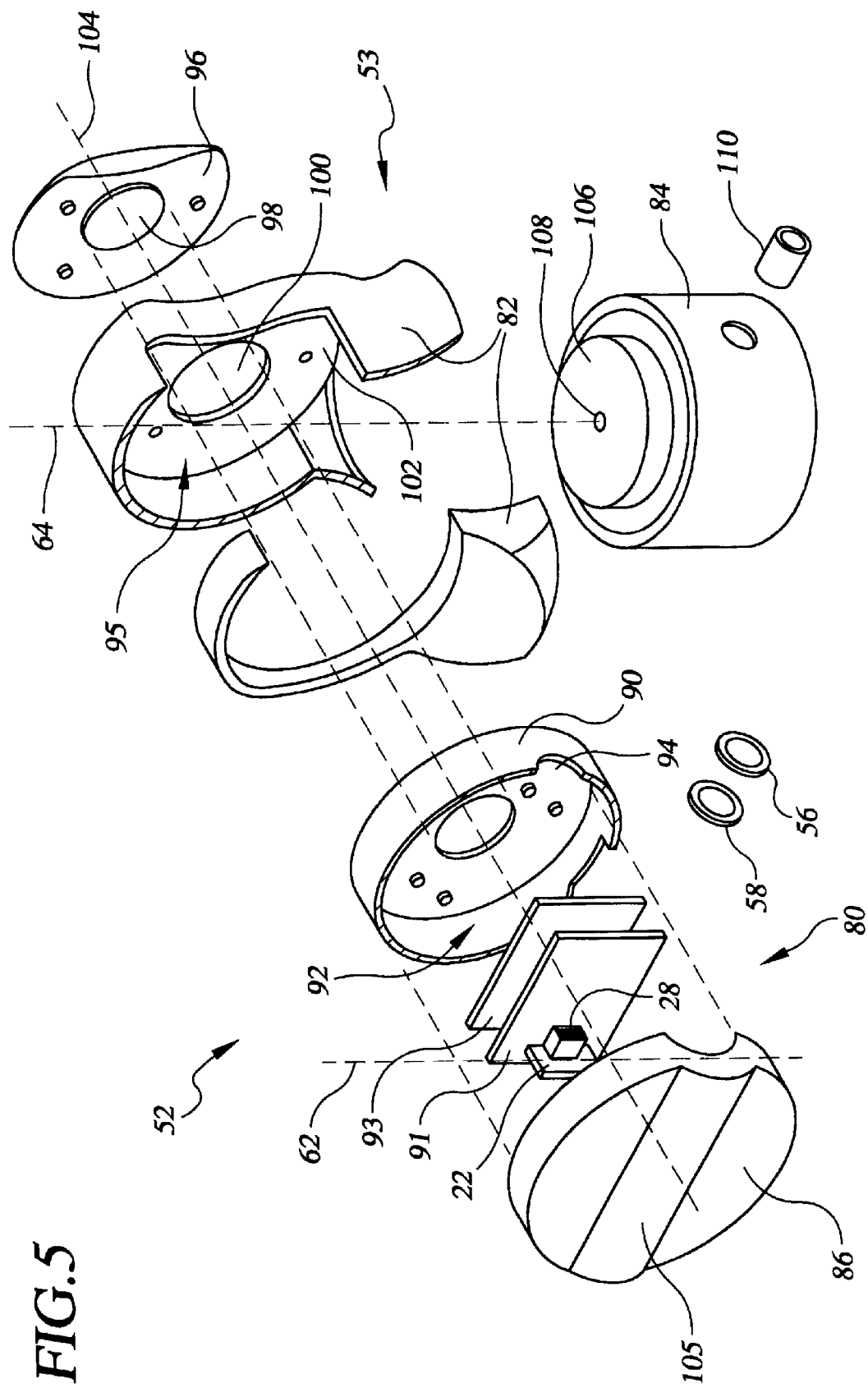
FIG. 5 is a partially exploded, partially cut-away, perspective view the embodiment of FIGS. 4A and 4B.

A prior art hand-held optical scanner, as discussed herein, can be modified in accordance with the principles of the present invention, as shown in FIGS. 2 and 3, to provide a preferred embodiment of a panoramic digital camera system 50 incorporating a camera assembly 52, a control unit 112, and a computer 42, and which is adapted for use with a conventional photography tripod 55. Specifically, the optics of the prior art scanner 10 are reconfigured so that distant objects can be focused. This involves reorienting lens 20 closer to CCD 22 than the optic arrangement of the scanner (FIG. 1) in order to obtain an essentially infinite focal point. So configured, the camera assembly 52 can focus on distant images, unlike the scanner 10 which is focus-limited to a fixed range of a few inches. As shown in the preferred embodiment of FIG. 2, the optic path 54 is reconfigured to a linear arrangement, thereby allowing removal of the prior art mirror 24 (FIG. 1). Additionally, as with the prior art scanner, a slit 28 is provided.

Since the lens 20 of the present invention is focused on objects in the "external environment" (i.e., the camera is not in contact with the work piece), an incorporated light source 18 is no longer necessary for all applications; however, the camera assembly 52 is subjected to the effects of increased amounts of infrared energy from the external environment. Since CCD photo-diodes (not shown) can be particularly sensitive to infrared energy, the camera assembly 52 preferably incorporates a two-tiered filtering scheme (filter means) to reduce the infrared energy being imaged by the CCD 22.

First, an adjustable aperture 56 is provided to control the amount of light received by the camera. Second, an infrared cutoff filter 58 is used as a high pass filter which blocks lower frequency infrared energy. In the preferred embodiment of FIG. 2, aperture 56 and filter 58 process the light entering the camera assembly 52 before the light is received by the slit 28 and lens 20. Additionally, some embodiments can incorporate a neutral density filter (not shown) for limiting the amount of light which is permitted to reach the CCD.

Alternative embodiments of the camera assembly 52 can incorporate other filter means, such as polarized filters, in lieu of or in addition to the aperture 56 and filter 58 in order to provide light of a proper intensity to the CCD. Also, embodiments can incorporate a faster (larger) lens with an adjustable f-stop to allow for more sensitivity, illumination, range, depth or field, and on-the-fly exposure.

As represented in FIG. 2, camera assembly 52 incorporates a camera body 53 which is typically rotatably mounted to a stepper motor 60 (motor means) so that the longitudinal axis 62 of the CCD 22 is substantially parallel to the rotational axis 64 of the motor 60 and so that the rotational axis 64 intersects (not shown in FIG. 2) the front nodal point of the lens. Stepper motor 60 is driven by motor controller 66 which actuates the rotation of camera assembly 52 about rotational axis 64, thereby providing access to 360° panoramic views. For even greater flexibility, the camera assembly 52 can be mounted on an apparatus, such as a tripod 55 (FIG. 3), so as to allow adjustment of the plane or cone of rotation of the optic path 54.

Analog signals generated by the pixels of the CCD 22 are used as inputs into analog interface electronics unit (AIE) 30 (analog interface means). AIE 30 amplifies or attenuates the analog signals in each of the red, green or blue pixel groups to condition or tune the analog data to produce a clear and accurate image. For convenience, amplification/attenuation potentiometers 68, 70, 72 and 74 for system gain and for the red, green, and blue pixel groups, respectively, are preferably externally accessible and are preferably mounted to a control unit 112 which is linked to the camera assembly 52 by standard transmission/reception cables so as to facilitate conditioning or tuning of the data without interfering with the assembly 52.

Alternative embodiments of the camera assembly 52 can incorporate a trilinear CCD color sensor to produce higher quality images. In contrast to the CCD sensor used in a Scanman 2000 which is a single strip of 1600 black and white sensors with individual color filters, a trilinear CCD incorporates three strips of sensors arranged side-by-side with separate red, green and blue filters. This configuration eliminates the need to demultiplex the colors and reduces color banding which is, otherwise, sometimes visible.

Once the analog signals have been conditioned, they are converted to digital data through ADC 38 (analog to digital conversion means). An external pulse generator 76 provides a series of pulses to ADC 38 and motor controller 66 for synchronizing the analog to digital conversion process of the analog signals with the rate of rotation of the stepper motor 60. The pulse generation rate is chosen so as not to overflow the image processing software which is being run on computer 42. A rate of rotation of 0.025° per pulse has been shown to be effective for the preferred embodiment disclosed herein. Furthermore, it should be noted that hand-held optical scanners traditionally use 8-bit digital encoding of the analog signals from the CCD pixels, which is usually sufficient for two-dimensional work pieces. However, since the digital camera is used in a three-dimensional world environment, 8-bit encoding will likely prove inadequate when processing high quality, high definition images. Therefore, it is envisioned that more advanced digital signal processors will be utilized in order to enhance the quality of the digital image.

The number of steps per revolution of the stepper motor 60 is typically chosen to produce square pixels so that the output image from the CCD will not have to be altered in aspect ratio (i.e. stretched to fit). This is a function of the lens resolution chosen. Since the vertical-field-of-view of the lens is the same regardless of the resolution, changing the step rate of the motor allows for generation of the square pixels.

Finally, the digitized color information from ADC 38 is transmitted to DIE 40 (digital interface means) and then to computer 42, typically through a parallel port (not shown), where image processing software interprets the digital data and displays the resulting image as a digital panoramic image adapted for interactive use in a virtual reality environment. For some applications, such as those which generate large data sets, different connections may be utilized, i.e. SCSI, FireWire (IEEE 1394 standard), etc. It is also envisioned that a built-in storage disk or RAM card can be utilized to eliminate the need for an external computer.

A preferred embodiment of the camera assembly 52 (FIGS. 3, 4A, 4B and 5) is formed of weather resistant materials, such as plastic, and can be formed in numerous manners, such as by an injection molding process, among others. The assembly 52 includes a body 53 incorporating camera housing 80 and bracket 82, and a base 84. Camera housing 80 has a first end wall 86, a second end wall 88 and a cylindrical side wall 90, which cooperate to define an interior space 92. Interior space 92 accommodates placement of the camera optics, including: filter 58, slit 28, lens (not shown), and CCD 22, as well as an AIE (not shown), an ADC (not shown) and an DIE (not shown), which are mounted on mother boards 91 and 93. Additionally, side wall 90 has an opening 94 formed therethrough for allowing light to enter the interior space 92 and for receiving adjustable aperture 56.

Camera housing 80 is partially received within bracket recess 95 and is rotatably mounted to bracket 82 by means of a mounting cap 96 which is fixedly mounted to the bracket. A hub 98 protrudes from the cap and cooperates with an orifice 100 formed in bracket side wall 102 as well as with end wall 88 of the camera housing so that a portion of bracket side wall 102 is disposed between mounting cap 96 and end wall 88. So configured, the housing 80, and in particular, the optic path 54 is rotatable through a predetermined angle about rotational axis 104 which intersects the front nodal point of the lens. Additionally, for ease of rotating the housing 80, some embodiments can incorporate a hand grip 105 configured on end wall 86.

Bracket 82 is rotatably mounted to base 84 by means of shaft 106 which engages the bracket and which extends from a stepper motor (not shown) which is mounted within the base. Shaft 106 has a rotational axis 64 which is oriented substantially parallel to longitudinal axis 62 of CCD 22, thereby providing proper alignment of the CCD. Additionally, rotational axis 64 intersects the front nodal point of the lens. Shaft 106 also incorporates an axial bore 108 which has a longitudinal axis oriented substantially coextensive with rotational axis 64 and which accommodates passage of data transmission/reception cables (not shown) from the mother boards 91 and 93 to a DIN port 110.

The angle of rotation of the optic path 54 about the axis 104 is preferably established in order to provide the camera with approximately a full vertical FOV (e.g. +90° to −90°). So configured, full panoramic images (e.g. 360° horizontal by approximately 180° vertical) can be acquired by adjusting the optic path of the camera. For example, the optic path 54 can be adjusted so that +90° (straight up) is included within the camera's FOV, after which the optic path is rotated about axis 64. After the 360° image generated during this rotation is stored in memory, the optic path is realigned by rotating housing 80 so that an overlap is formed between the lower part of the previously acquired image and the upper part of the image to be acquired. The optic path is then rotated about axis 64 so that an additional 360° image is acquired. These steps are repeated until an image possessing the desired vertical FOV is acquired. Since the vertical FOV of the camera is necessarily dependent upon the optical characteristics of the lens used, the angle of rotation about axis 104 may vary among alternative embodiments in order to produce full panoramic images.

As shown in FIG. 6, an external control unit 112 is also provided which mounts amplification/attenuation potentiometers 68, 70, 72 and 74 for controlling system gain and the red, green, and blue pixel groups. The control unit also can provide a control 114 for adjusting the rate of rotation of the camera body 53 by providing inputs to the pulse generator 76. Additionally, some embodiments of the control unit 112 can incorporate a display 116 for indicating the power level of a battery (not shown) which can be provided for powering the motor 60.

Although the preferred embodiment of the present invention is described herein as being constructed in part from "off the shelf" components, and in particular, from optical components utilized in a Scanman 2000 hand-held optical scanner, the present invention is not so limited. Inasmuch as the preferred embodiment offers potential cost savings over embodiments constructed from other suitable components, other embodiments may be practiced from the teachings of the present invention without resort to the particular components disclosed in the preferred embodiment.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

The following is claimed:

1. A method for creating digital images comprising the steps of:

providing an optic path such that light propagates along said optic path;

providing a charge coupled device along said optic path color responsive to light such that said charge coupled device generates analog signals corresponding to color information which is transmitted thereto from the light propagated along said optic path;

aligning said optic path at a first angle relative to a rotational axis that is substantially perpendicular to said optic path when said optic path is in a horizontal position;

rotating said optic path about said rotational axis with a motor such that said charge coupled device generates a first set of analog signals;

processing said first set of analog signals;

synchronizing said processing of said first set of analog signals with said rotating of said optic path such that a first set of digital signals corresponding to said color information is produced, aligning said optic path at a second angle relative to said rotational axis;

rotating said optic path about said rotational axis with said motor such that said charge coupled device generates a second set of analog signals;

processing said second set of analog signals;

synchronizing said processing of said second set of analog signals with said rotating of said optic path such that a second set of digital signals corresponding to said color information is produced;

converting said first and second sets of digital signals into a digital image.

2. A method for producing panoramic images, comprising the steps of:

providing an optic path such that light propagates along said optic path;

providing a charge coupled device along said optic path that is color responsive to light such that said charge coupled device generates analog signals corresponding to color information which is transmitted thereto from the light propagated along said optic path;

aligning said optic path at a first vertical angle relative to a rotational axis that is substantially perpendicular to said optic path when said optic path is in a horizontal position;

rotating said optic path about said rotational axis through a first horizontal angle relative to said rotational axis such that said charge coupled device generates a first set of analog signals;

converting said first set of analog signals into a first set of image data;

aligning said optic path at a second vertical angle relative to said rotational axis;

rotating said optic path about said rotational axis through a second horizontal angle relative to said rotational axis such that said charge coupled device generates a second set of analog signals;

converting said second set of analog signals onto a second set of image data; and combining said first set of image data with said second set of image data to produce a panoramic image.

3. The method of claim 2, wherein the position of said optic path when it is aligned at said second vertical angle overlaps the position of said optic path when it is aligned at said first vertical angle.

4. The method of claim 2, wherein said first horizontal angle and said second horizontal angle are equivalent.

5. The method of claim 2, wherein said panoramic image is three-dimensional.

6. The method of claim 2, wherein:

said step of converting said first set of analog signals into a first set of image data comprises:
 processing said first set of analog signals; and
 synchronizing said processing of said first set of analog signals with said rotating of said optic path such that said first set of image data is generated that corresponds to said color information; and said step of converting said second set of analog signals into a second set of image data comprises:
 processing said second set of analog signals; and
 synchronizing said processing of said second set of analog signals with said rotating of said optic path such that said second set of image data is generated that corresponds to said color information.

7. A method for producing panoramic images, comprising the steps of:

providing an optic path such that light propagates along said optic path;

providing a charge coupled device along said optic path that is color responsive to light such that said charge coupled device generates analog signals corresponding to color information which is transmitted thereto from the light propagated along said optic path;

rotating said optic path repetitiously about a rotational axis through a pre-determined horizontal angle relative to said rotational axis, wherein said rotational axis is substantially perpendicular to said optic path when said optic path is in a horizontal position, said optic path is positioned at a different vertical angle relative to said rotational axis during each repetition of said rotating, and said charge coupled device generates a set of analog signals corresponding to each repetition of said rotating;

converting each of said set of analog signals corresponding to each repetition of said rotating into a set of image data corresponding to each repetition of said rotating; and combining each of said set of image data corresponding to each repetition of said rotating to produce a panoramic image.

8. The method of claim 7, wherein said rotating of said optic path is repeated for a number of repetitions such that said optic path has been positioned through an entire pre-determined vertical field of view.

9. The method of claim 7, wherein each position of said optic path at said different vertical angle relative to said rotational axis overlaps such that a subsequent position of said optical path overlaps with an immediately previous position of said optic path.

10. A digital panoramic camera system comprising:

a camera body defining an interior space and having an opening formed therethrough for communicating light into said interior space such that the light entering said interior space through said opening propagates along an optic path;

an adjustable aperture adapted and arranged within said interior space along said optic path, said aperture adjustable between an open and a closed position, such that said aperture in said open position provides at least a portion of the light communicated into said interior space along said optic path;

a charge coupled device having an array of photo diodes arranged thereon, said charge coupled device being contained within said interior space for receiving light provided along said optic path such that said charge coupled device provides analog signals corresponding to color information transmitted by the light provided along said optic path;

an analog interface electronics unit configured to receive and tune said analog signals received from said charge coupled device, said analog interface electronics unit adapted and arranged within said interior space;

an analog to digital converter configured to convert analog signals to digital signals, said analog to digital converter adapted and arranged within said interior space such that said analog to digital converter receives said analog signals from said analog interface electronics unit and converts said analog signals to digital signals;

a digital interface electronics unit configured to provide said digital signals to a computer, said digital interface electronics unit adapted and arranged within said interior space;

a pulse generator configured to produce a series of pulses, and;

a motor configured to be responsive to each of said pulses;

wherein said camera body is configured to rotatably engage said motor such that said camera body rotates repetitiously through a horizontal angle in response to each of said pulses and enables said charge coupled device to produce analog signals corresponding to a scene, said camera body being further configured such that said camera body is positioned at a different vertical angle during each repetition of rotation of said camera body, and said analog to digital converter is responsive to each of said pulses such that conversion of said analog signals to said digital signals is synchronized with the rotation of said camera body thereby enabling generation of a panoramic image corresponding to the scene.

11. The system of claim 1, wherein said optic path is substantially linear.

12. The system of claim 11, wherein said charge coupled device is a linear charge coupled device.

13. The system of claim 11, wherein said charge coupled device is a trilinear charge coupled device.

14. The system of claim 1, wherein said camera body comprises a camera housing and a mounting bracket, said camera housing rotatably mounted to said mounting bracket and rotatable about a second rotational axis, said second rotational axis substantially perpendicularly disposed relative said longitudinal axis of said charge coupled device, and wherein said mounting bracket rotatably engages said motor.

15. The system of claim 9, wherein said charge coupled device has a longitudinal axis and said motor has a first rotational axis, and wherein said longitudinal axis is substantially parallel to said first rotational axis.

* * * * *

UNITED STATES PATENT AND TRADEMARK OFFICE
CERTIFICATE OF CORRECTION

PATENT NO. : 6,545,701 B2  Page 1 of 1
DATED : April 8, 2003
INVENTOR(S) : Michael J. Sinclair et al.

It is certified that error appears in the above-identified patent and that said Letters Patent is hereby corrected as shown below:

Column 12,
Lines 1 and 8, after "claim", delete "1" and replace with -- 10 --.
Lines 3 and 6, after "claim", delete "11" and replace with -- 10 --.
Line 16, after "claim", delete "9" and replace with -- 10 --.

Signed and Sealed this

Nineteenth Day of August, 2003

JAMES E. ROGAN
*Director of the United States Patent and Trademark Office*